US008457568B2

(12) United States Patent
Le Guillou et al.

(10) Patent No.: US 8,457,568 B2
(45) Date of Patent: Jun. 4, 2013

(54) SYSTEM AND METHOD FOR PROCESSING A RECEIVED SIGNAL

(75) Inventors: Yann Le Guillou, Caen (FR); Volker Aue, Dresden (DE)

(73) Assignee: NXP B.V., Eindhoven (NL)

(*) Notice: Subject to any disclaimer, the term of this patent is extended or adjusted under 35 U.S.C. 154(b) by 930 days.

(21) Appl. No.: 12/529,735

(22) PCT Filed: Feb. 18, 2008

(86) PCT No.: PCT/IB2008/050580
§ 371 (c)(1),
(2), (4) Date: Sep. 3, 2009

(87) PCT Pub. No.: WO2008/107812
PCT Pub. Date: Sep. 12, 2008

(65) Prior Publication Data
US 2010/0062721 A1    Mar. 11, 2010

(30) Foreign Application Priority Data

Mar. 5, 2007   (EP) .................................... 07290293
Feb. 18, 2008  (WO) .................. PCT/IB2005/050580

(51) Int. Cl.
*H03C 1/62* (2006.01)
(52) U.S. Cl.
USPC ........................ 455/115.1; 455/78; 455/295
(58) Field of Classification Search
USPC ....................................................... 455/115.1
See application file for complete search history.

(56) References Cited

U.S. PATENT DOCUMENTS

| 6,507,728 | B1 | 1/2003 | Watanabe et al. | |
| 6,961,019 | B1* | 11/2005 | McConnell et al. | 342/357.59 |
| 2002/0080728 | A1 | 6/2002 | Sugar et al. | |
| 2005/0069063 | A1* | 3/2005 | Waltho et al. | 375/346 |
| 2006/0239380 | A1* | 10/2006 | Khlat et al. | 375/297 |

FOREIGN PATENT DOCUMENTS

| EP | 1233530 A | 8/2002 |
| EP | 1524773 A2 | 4/2005 |
| JP | 09247101 A | 9/1997 |
| WO | 0052838 A | 9/2000 |
| WO | 2005104390 A1 | 11/2005 |

OTHER PUBLICATIONS

Aparin, V.Ladimir; "A Modified LMS Adaptive Filter Architecture With Improved Stability at RF"; Proceedings of ESSCIRC; pp. 235-238; Grenoble, France; 2005.
Aparin, Vladimir., et al; "An Integrated LMS Adaptive Filter of TX Leakage for CDMA Receiver From End"; IEEE Journal of Solid-State Circuits; vol. 41, No. 5; p. 1171-1182; May 2006.

* cited by examiner

*Primary Examiner* — Ajibola Akinyemi
(74) *Attorney, Agent, or Firm* — Kramer & Amado PC (57) ABSTRACT

In a method for processing a signal received by a receiver, at a first wireless receiver (20, 62) a first signal (x(t), x1(t)) comprising first and second signal components is received. The first signal component is intended for the first wireless receiver (20, 62) and the second signal component is related to at least one of a sending signal (s(t)) generated by a transmitter (29, 69) or to a second signal (x2(t)) intended for a second wireless receiver (61). To the first wireless receiver (20, 62) a reference signal (r(t), r1(t), r2(t)) which is proportional to the sending signal (s(t)) or to the second signal (x2(t)). At the first wireless receiver (20, 62) and from the reference signal (r(t), r1(t), r2(t)) an estimation signal which estimates the second signal component is generated. A filtered signal (y(t), y1(t)) is generated by subtracting the estimation signal from the first signal (x(t), x1(t)).

19 Claims, 4 Drawing Sheets

SYSTEM AND METHOD FOR PROCESSING A RECEIVED SIGNAL

FIELD OF THE INVENTION

The invention relates to a system and to a method for processing a received signal.

BACKGROUND OF THE INVENTION

Wireless communication methods in particular implemented in mobile devices have recently become more popular. Especially when implementing more than one communication method within a single mobile device, such as a mobile phone, and operating the communication methods simultaneously particularly at similar frequencies, then signals related to the communication methods may interfere, compromising the quality of the communication methods. An example of such a scenario is a mobile device, for instance, a mobile phone used for wireless voice over IP via WLAN, while the user of the mobile phone further utilizes a wireless headset based, for instance, on Bluetooth. Then, if the Bluetooth device of the mobile phone transmits a signal, for instance, a burst to the headset, then the WLAN receiver of the mobile phone also picks up the burst. Since Bluetooth and WLAN operate at similar frequency bands, the burst transmitted by the Bluetooth device may corrupt an incoming signal intended for the WLAN receiver of the mobile phone.

Figure 1:
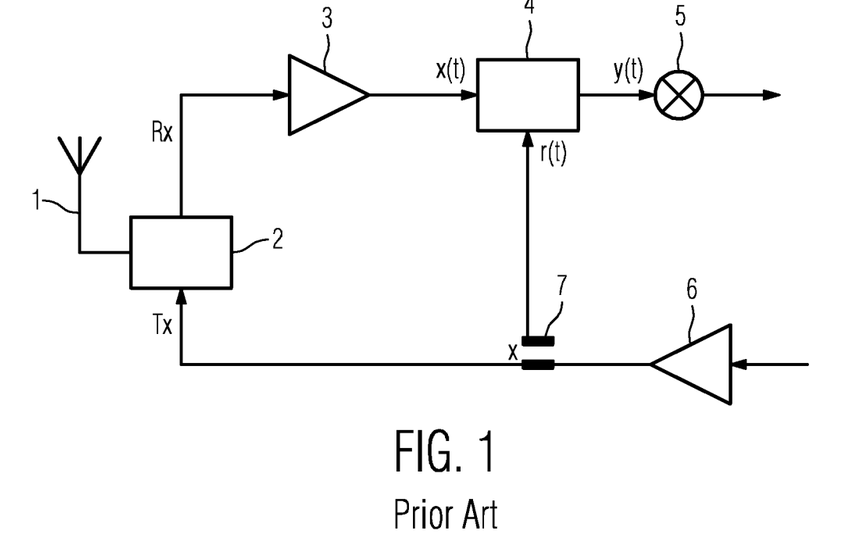
FIG. 1, as discussed above, is a conventional CDMA transceiver.

V. Aparin discloses in "A Modified LMS Adaptive Filter Architecture with Improved Stability at RF", Proceedings of ESSCIRC, pp. 235-238, Grenoble, France 2005, and V. Aparin et. al. disclose in "An Integrated LMS Adaptive Filter of TX Leakage for CDMA Receiver Front End", IEEE Journal of Solid-State Circuits, Vol. 41, No. 5, pp. 1171-1182, May 2006 an LMS adaptive filter to reject leakage of a sending signal into a receiving signal of a Code Division Multiple Access (CDMA) based transmitter. FIG. 1 shows a CDMA transceiver as disclosed by V. Aparin.

The transceiver comprises an antenna 1, a duplexer or diplexer 2, a low noise amplifier 3, an LMS adaptive filter 4, a mixer 5, and a power amplifier 6. The transceiver is configured to operate in full-duplex mode and thus can send signals at the same time while receiving signals.

A sending signal is amplified by the power amplifier 6 and is emitted by the antenna 1. A received signal is captured by the antenna 1 and is amplified by the low noise amplifier 3. The diplexer 2 is used to separate a receive path Rx used for the received signal and a transmit path Tx for the sending signal. A real diplexer 2 does not separate the receive and the transmit paths Rx, Tx ideally, so that a portion of the sending signal leaks into the receive path Rx. Thus, a signal x(t) output by the low noise amplifier 3 comprises, besides the received signal, a signal component related to the sending signal. In other words, the signal x(t) is the received signal corrupted by the sending signal.

The LMS adaptive filter 4 is used to at least approximately generate the uncorrupted received signal from the signal x(t) by filtering out at least approximately the component related to the sending signal from the signal x(t). The output signal of the LMS adaptive filter 4 is denoted as y(t) and is the input signal for the mixer 5.

In order to at least approximately filter out the component related to the sending signal, a reference signal r(t) is coupled out from the transmit path Tx using an appropriate device 7. The reference signal r(t) is related to the sending signal and is input to the LMS adaptive filter 4. The LMS adaptive filter 4 is configured to estimate the component related to the sending signal within the signal x(t) utilizing the reference signal r(t) and then to subtract the estimated component from the signal x(t) in order to generate the signal y(t). The LMS adaptive filter 4 may be trained during an initial calibration procedure based on the least mean square (LMS) method.

OBJECT AND SUMMARY OF THE INVENTION

It is an object of the present invention to provide a method improving the quality of a signal received by a receiver, wherein the signal may be corrupted by a sending signal generated by a transmitter operating independently from the receiver or wherein the signal may be corrupted by a signal intended for a further receiver.

A further object of the invention is to provide a system comprised of a first wireless receiver and a second wireless receiver and/or a transmitter, wherein at least the signal received by the first wireless receiver has an improved quality.

The object is achieved in accordance with the invention by means of a method for processing a signal received by a receiver, comprising the steps of:

receiving at a first wireless receiver a first signal which comprises first and second signal components, wherein the first signal component is intended for the first wireless receiver and the second signal component is related to at least one of a sending signal generated by a transmitter or to a second signal intended for a second wireless receiver, and wherein the first wireless receiver operates independently from the second wireless receiver or from the transmitter;

providing to the first wireless receiver a reference signal which is proportional to the sending signal or to the second signal;

generating at the first wireless receiver and based on the reference signal an estimation signal which estimates the second signal component; and generating a filtered signal by subtracting the estimation signal from the first signal.

The object is also achieved in accordance with the invention by means of a system comprising a first wireless receiver which comprises a first filter configured to receive a first signal, wherein the first signal comprises a first signal component intended for the first wireless receiver and a second signal component; and at least one of a second wireless receiver receiving a second signal or a transmitter generating a sending signal; wherein the second signal component relates to said second signal or to the sending signal, the first wireless receiver operates independently from the second wireless receiver and the transmitter, the second wireless receiver or the wireless transmitter comprises a device for generating a reference signal which is proportional to the sending signal or to the second signal, and the first filter is configured to generate from the reference signal an estimation signal which estimates the second signal component and to generate a filtered signal by subtracting the estimation signal from the first signal. The first filter may preferably be an analog filter.

The inventive system is comprised of the first wireless receiver which may comprise an antenna and capture a signal. This signal comprises the first component intended for the first wireless receiver and may also comprise further signal components. The further signal components may be the second signal component and thus may be related to a signal intended for the second wireless receiver. Particularly, if the first and second wireless receivers operate at similar frequencies, then the second signal component may significantly disturb the performance of the first wireless receiver. This is even more pronounced if the first and second receivers are at least partly integrated on the same circuit board or if the first and second receivers share a common antenna. Such an inventive system may particularly be a mobile device.

According to the inventive method or the inventive system, the first wireless receiver comprises the first filter. This filter is designed to at least approximately filter out the second signal component from the first signal. This is achieved in accordance with the invention by generating the estimation signal estimating the second signal component. Since the second signal component may be related to the signal intended for the second wireless receiver, the estimation signal can be estimated utilizing the signal received by the second wireless receiver or, in other word, by utilizing the reference signal as being proportional to this received signal.

Generally, the second signal component will be phase-shifted in respect to, and/or has a different amplitude than, the received signal at the second wireless receiver. Thus, the first filter particularly phase-shifts and/or adjusts the amplitude of the reference signal appropriately for estimating the estimation signal. The appropriate phase-shift and/or amplitude adjustment may be carried out during a calibration process particularly utilizing the least square method.

The second signal component may alternatively originate from the transmitter operating independently from the first wireless receiver. Then, the sending signal generated by the transmitter may be taken as a basis for the reference signal.

The first signal, i.e. the signal for the first wireless receiver, may be corrupted by the second signal, i.e. the signal intended for the second wireless receiver, and by the sending signal at the same time. Then, the first signal may comprise a component related to the second signal and a component related to the sending signal. Then, the first filter of the first wireless receiver may be configured to generate a first estimation signal estimating the component related to the second wireless receiver and a second estimation signal related to the sending signal so that the filtered signal is generated by subtracting the first and second estimation signals from the first signal.

According to an embodiment of the inventive method or the inventive system, the filtered signal is only generated in accordance to a pre-defined condition. The pre-defined condition may be one of a minimum power of the reference signal, an external control signal, or information if the second signal component relates to the sending signal or to the second signal. If the second wireless receiver does not receive a signal or the transmitter does not send the sending signal, then the first signal does not comprise the second signal component and the filtering utilizing the analog filter is not necessary. Then, the first filter can be by-passed. The by-passing may be achieved utilizing the external control signal.

If the second wireless receiver does not receive a signal and the transmitter does not send the sending signal, then the power of the reference signal is, if at all, very small, allowing to by-pass the analog filter. Thus, the amount of power of the reference signal may be taken as a condition for by-passing the first filter of the first wireless receiver.

The second wireless receiver and the transmitter may be incorporated into a transceiver which may operate either in a receiving mode to receive the second signal or in a sending mode to send the sending signal. Then, the first filter of the first wireless receiver may be configured to estimate the estimation signal based on the sending and receiving modes. As already mentioned, the first filter may phase-shift and/or adjust the amplitude of the reference signal in order to generate the estimation signal. Since the phase-shift and/or the amplitude adjustment generally differ if the sending signal or the signal intended for the second wireless receiver is used for the estimation signal, this variant of the inventive system or the inventive method can be used to adapt the filter characteristics of the first filter in accordance to the mode of operation of the transceiver.

In one embodiment, the inventive method comprises the following further steps:

receiving, utilizing a single antenna, a received signal which comprises a signal component related to the signal intended for the first wireless receiver and to a signal component related to a signal intended for the second wireless receiver;

generating the first signal by partly filtering out from the received signal the signal component intended for the second wireless receiver;

generating an estimation of the second signal by partly filtering out from the received signal the signal component related to the signal intended for the first wireless receiver;

generating as the reference signal a first reference signal as a signal being proportional to the estimation of the second signal, generating a first estimation signal as the estimation signal utilizing the first reference signal; and generating the filtered signal by subtracting the first estimation signal from the first signal.

In order to carry out these additional steps, the inventive system may comprise a single antenna to receive a received signal which comprises a signal component related to a signal intended for the first wireless receiver and to a signal component related to the signal intended for the second wireless receiver;

a second filter generating the first signal by partly filtering out from the received signal the signal component intended for the second wireless receiver;

a third filter generating an estimation of the second signal by partly filtering out from the received signal the signal component related to the signal intended for the first wireless receiver; and a device for generating a first reference signal as a signal being proportional to the estimation of the second signal, wherein the first filter is configured to generate a first estimation signal as the estimation signal utilizing the first reference signal and to generate the filtered signal by subtracting the first estimation signal from the first signal.

According to this embodiment, the first and second receivers receive their signals utilizing a common antenna. This is advantageous in terms of cost savings and miniaturization. In order to filter out from the received signal components intended for the second wireless receiver, the first wireless receiver comprises the second filter. This filter may particularly be a band-pass filter tuned to the frequency of the signal intended for the first wireless receiver. The second wireless receiver may comprise a respective band-pass filter tuned to the frequency of the signal intended for the second wireless receiver. Since the two filters do only attenuate unwanted signal components, the output signal of the first filter, i.e. the filter of the first wireless receiver, still comprises a signal component related to the signal intended for the second wireless receiver. When the signal strength of the signal intended for the second wireless receiver, despite being attenuated by the relevant band-pass filter, is greater than the wanted incoming signal intended for the first receiver, it can still corrupt the reception of the first receiver by two mechanisms:

1) de-sensitization
2) cross-modulation

The output signal of the first filter is the first signal.

In order to further filter out the second filter component from the first signal, the first signal is passed through the first filter which estimates the second component based on the output signal of the third filter, resulting in an improved signal (filtered signal) for, for instance, a further decoder stage of the first wireless receiver.

The inventive system may also include the transmitter generating the sending signal. Then, the following further steps may be carried out:

generating a second estimation signal utilizing a second reference signal which is proportional to the sending signal; and generating the filtered signal by subtracting the second estimation signal from the first signal in addition to subtracting the first estimation signal from the first signal.

The signal intended for the second wireless receiver may comprise signal components related to the sending signal and/or to the signal intended for the first wireless receiver. Then, the second wireless receiver may also comprise a fourth filter which estimates unwanted signal components and filters them out from the signal received by the second wireless receiver. The fourth filter may particularly be an analog filter.

The first wireless receiver may be a mobile TV or a mobile radio utilizing, for instance, the DVB-H standard. The second wireless receiver and/or the transmitter may be based on GSM. The frequency of the DVB-H signal is in the proximity of the GSM uplink channel.

The inventive system may particularly be a mobile device, incorporating, for instance, wireless connectivity, such as Bluetooth and Wireless LAN, wireless metropolitan area network (WMAN) connectivity, such as WiMax/Wibro, broadcast connectivity, such as TV on Mobile DVB-H, or cellular connectivity such as GSM, EDGE, UMTS.

The inventive system may be incorporated into the following pairings: Bluetooth WLAN, DVB-H-GSM, DVB-SH—UMTS, and WLAN-UMTS.

BRIEF DESCRIPTION OF THE DRAWINGS

The invention will be described in greater detail hereinafter, by way of non-limiting examples, with reference to the embodiments shown in the drawings.

DESCRIPTION OF EMBODIMENTS

FIG. 1 has been discussed in the introduction.

Figure 2:
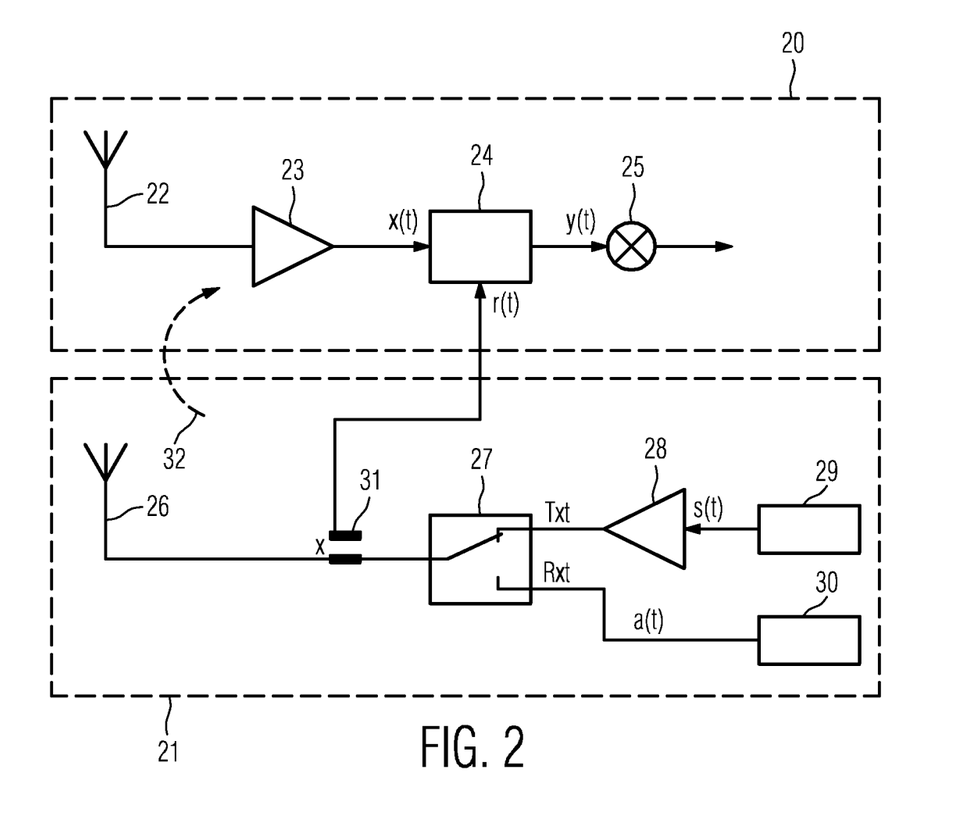
FIG. 2 is a system comprised of a transceiver and a receiver.

FIG. 2 shows a system comprised of a radio frequency (RF) receiver 20 and an RF transceiver 21. The receiver 20 and the transceiver 21 operate independently from each other but may be incorporated into a single device, for instance, a mobile device. Particularly, the components of the transceiver 21 and the receiver 20 may be at least partly attached to the same circuit board not explicitly shown in the figures.

For the exemplary embodiment, the receiver 20 comprises an antenna 22 for capturing signals sent by a first external sender not shown in the figures, an amplifier 23 connected to the antenna 22, an analog filter 24 connected to the output of the amplifier 23, and a mixer 25. The amplifier 23 may be a low noise amplifier.

For the exemplary embodiment, the transceiver 21 comprises its own dedicated antenna 26 used for capturing signals sent by a second external sender not shown in the figures and being different from the first external sender, a switch 27 connected to the antenna 26, an amplifier 28, and further transmitter and receiver circuits 29, 30. The receiver circuit 30 is configured to accept and process a received signal a(t) captured by the antenna 26. The received signal a(t) originates from the second external sender. The transmitter circuit 29 is configured to generate a sending signal s(t) which is amplified by the amplifier 28 which may be a power amplifier. The amplified sending signal is then transmitted by the antenna 26 to an external receiver not shown in the figures. The transceiver 21 can either operate in a sending mode or in a receiving mode. When operating in the sending mode, then the switch 27 is set such that a transmit path Txt of the transceiver 21 runs from the transmitter circuit 29 to the antenna 26. When operating in the receiving mode, then the switch 27 is set such that a receive path Rxt of the transceiver 21 runs from the antenna 26 to the receiver circuit 30.

During operation of the system comprised of the receiver 20 and the transceiver 21, it may happen that the receiver 20 receives a signal while the transceiver 21 receives or transmits a signal a(t), s(t), respectively. Then, particularly when the operating frequencies of the receiver 20 and the transceiver 21 are relatively close, then a signal x(t) captured by the antenna 22 and amplified by the amplifier 23 may comprise a component related to the sending signal s(t). This is indicated by an arrow.

In order to filter out at least approximately components related to the sending signal s(t) of the signal x(t) output by the amplifier 23, the signal x(t) is passed through the analog filter 24. The analog filter 24 is configured to generate an estimation signal est(x) which is an estimation of the components related to the sending signal s(t) of the transceiver 21. The analog filter 24 is further configured to generate a signal y(t) by subtracting the estimation signal est(t) from the signal x(t) output by the amplifier 23. The signal y(t) is then fed to the mixer 25 for further processing.

In order to generate the estimation signal est(t), a reference signal r(t) is fed to the analog filter 24. For the exemplary embodiment, the reference signal r(t) is coupled out from a path connecting the antenna 26 with the switch 27 of the transceiver 21 by an appropriate device 31. Thus, the reference signal r(t) is proportional to the sending signal s(t) of the transceiver 21 when the transceiver 21 is in its sending mode.

The signal components of the signal x(t) to be filtered out are related to the sending signal s(t) of the transceiver 21 and thus are proportional to the reference signal r(t). Generally, these signal components may phase-shifted in respect to the reference signal r(t) and/or may differ in their amplitudes. In order to satisfactory filtering out these signal components corrupting the signal x(t) the filter 24 thus generates the estimation signal est(t) by appropriately phase-shifting and/or adjusting the amplitude of the reference signal r(t). The correct or at least a satisfactory phase-shift and/or amplitude adjustment of the reference signal r(t) may be found during an initial training process similar to the initial training process used for the conventional transmitter disclosed by V. Aparin. The training process may particularly be based on the least mean square (LMS) method.

Figure 3:
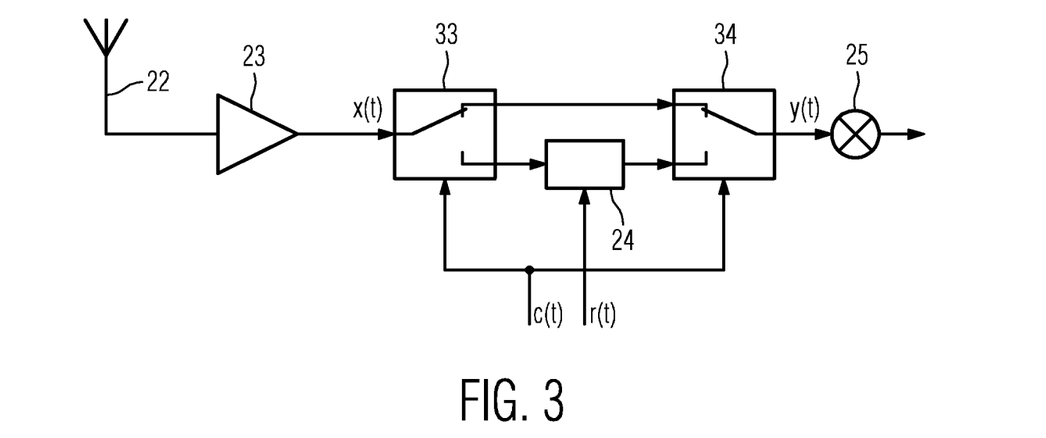
FIG. 3-5 are alternative embodiments of the system of FIG. 2.

Normally, the transceiver 21 corrupts only signals received by the transmitter 20 when the transceiver 21 is active. When the transceiver 21 does not send a sending signal s(t), then the analog filter 24 of the transmitter 20 may be by-passed. FIG. 3 shows an exemplary embodiment of such a by-pass which is realized by two switches 33, 34 controlled by a control signal c(t). The control signal c(t) may be an external signal and switches the switches 33, 34 in the position as depicted in FIG. 3 when the transceiver 21 is inactive to by-pass the analog filter 24. If the transceiver 21 sends the sending signal s(t), then the control signal c(t) switches the analog filter 24 between the amplifier 23 and the mixer 25.

Figure 4:
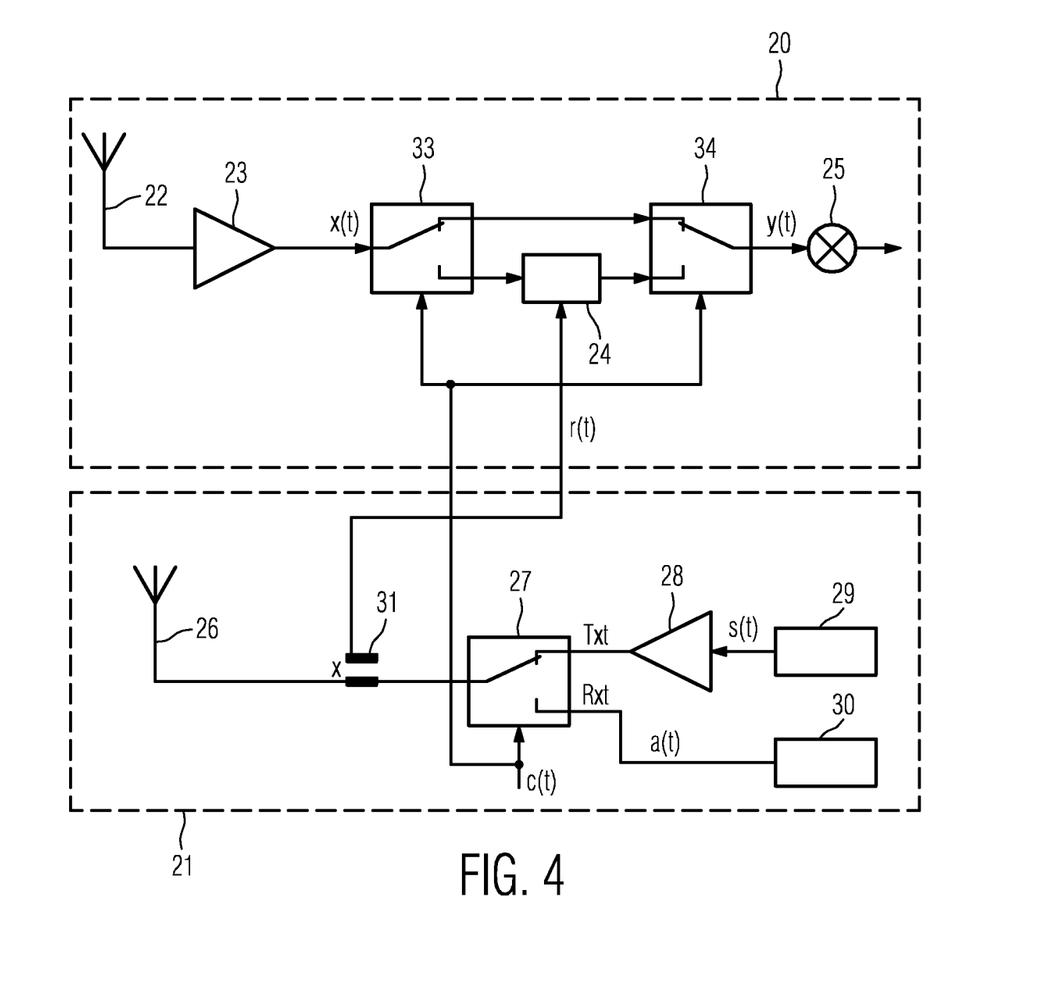

The control signal c(t) may be derived in response to the mode of operation of the transceiver 21, as shown in FIG. 4. Then, the control signal c(t) can also be used to control the switch 27 of the transceiver 21 in order to switch the transceiver 21 in its receiving or sending mode. Then, it may also be possible to activate the analog filter 24 only when the transceiver 21 is in its sending mode.

Figure 5:
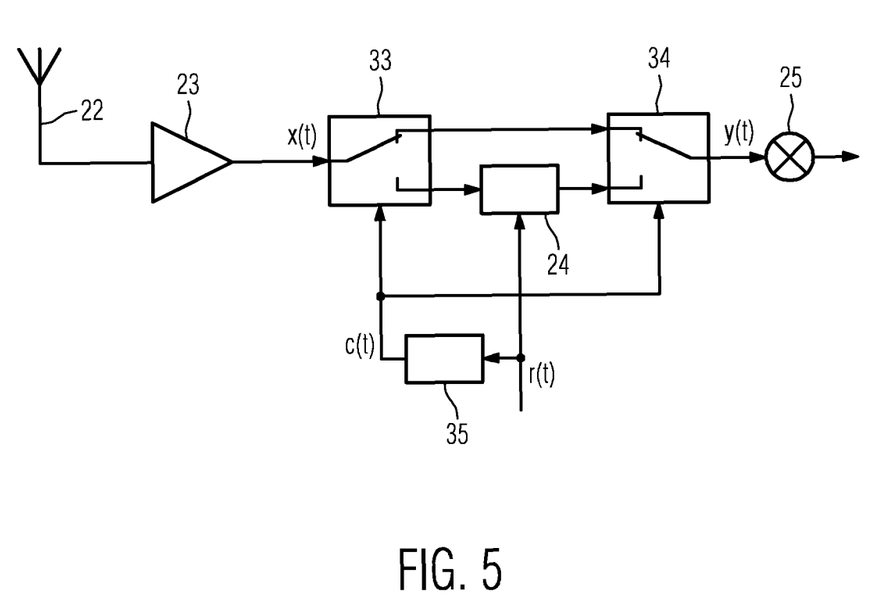

The control signal c(t) may alternatively be generated in response to the reference signal r(t) as it is shown in FIG. 5. Then, the switches 33, 34 may, for instance, only activate the analog filter 24 if the power of the reference signal r(t) exceeds a pre-defined power level. If the reference signal r(t) is below the pre-defined power level, then the analog filter 24 is by-passed. An advantage of this embodiment is that the pre-defined power level can be chosen such that the filter 24 is only activated when the sending signal s(t) of the transceiver 21 is sufficiently high to significantly corrupt the received signal of the receiver 20. The power level of the reference signal r(t) may be measured by a power detector 35 as shown in FIG. 5.

Figure 6:
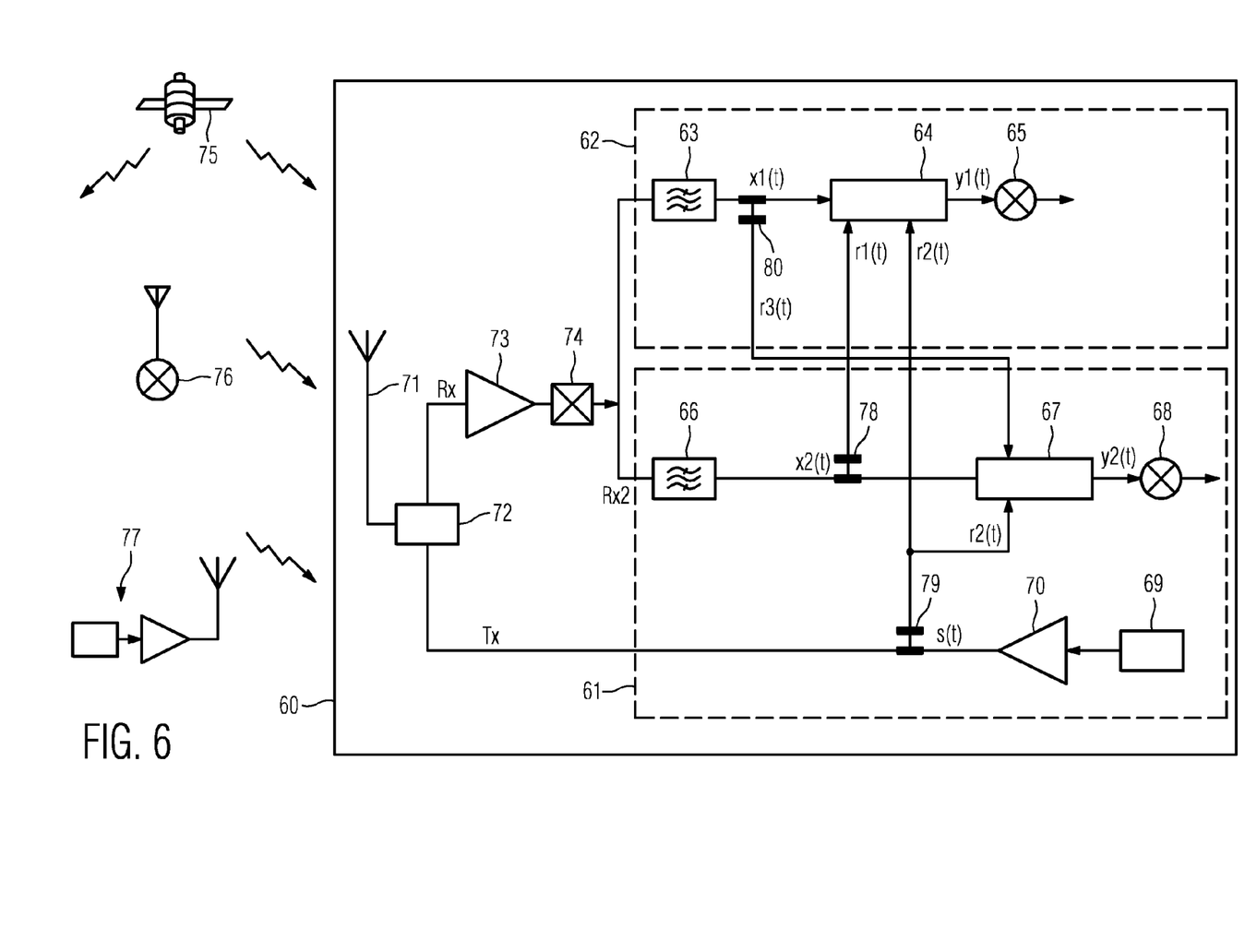
FIG. 6 is a front-end of a mobile device.

FIG. 6 shows a mobile device 60 as a further example of a system comprised of a transceiver 61 and a receiver 62.

For the exemplary embodiment, the receiver 62 is a DVB-SH (digital video broadcast satellite handheld) receiver 62 operating in the 2170-2200 MHz range and the transceiver 61 basically realizes UMTS (Universal Mobile Telecommunication System) mobile telephoning functionality operating in the so called band 1.

The receiver 62 comprises an analog band-pass filter 63 tuned to the DVB-SH frequency, an analog filter 64 connected down-stream to the band-pass filter 63, and a mixer 65 connected down-stream to the filter 64. The mixer 65 is connected to further DVB-circuits not explicitly shown in the figures.

The transceiver 61 has a receiver and a transmitter part. For the exemplary embodiment, the receiver part operates in the range of 2110-2170 MHz (Receive band I) and comprises an analog band-pass filter 66 tuned to the UMTS frequency, an analog filter 67 connected downstream to the band-pass filter 66, a mixer 68 connected down-stream to the analog filter 67, and further UMTS receiver circuits not explicitly shown in the figures. The transmitter part of the transceiver 61 operates in the range of 1920-1980 MHz and comprises a transmitter circuit 69 for generating a sending signal and an amplifier 70 to generate an amplified sending signal s(t).

For the exemplary embodiment, the mobile device 60 further comprises a single antenna 71 for both, the transceiver 61 and the receiver 62. In order to share the common antenna 71, the mobile device 60 comprises a diplexer 72 such that the transmit path Tx of the transmitter part of the transceiver 61 and a common receive path Rx for the receiver 62 and the receiving part of the transceiver 61 can share the common antenna 71 and the transceiver 61 can transmit and receive signals simultaneously while the receiver 62 receives signals.

The receive path Rx comprises an amplifier 73 which is, for instance, a low noise amplifier and a splitter 74 to split the receive path Rx into a first receive path Rx1 associated with the receiver 62 and into a second receive path Rx2 associated with the receiving part of the transceiver 61.

The receiver 62 is configured to receive and process signals sent by a DVB transmitter. The DVB transmitter basically comprises a DVB-SH satellite 75 and one or more repeaters 76.

The transceiver 61 is configured to communicate with a UMTS station 77.

Since for the exemplary embodiment, the DVB-SH receiver 62 operates in the 2170-2200 MHz range and the transceiver 61 operates in the band 1, the frequency spacing between the DVB-SH receiving band and the UMTS receiving band can be as low as 5 MHz, when the receiver 62 receives a signal having a frequency of 2172.5 MHz and the transceiver 61 receives a signal at a frequency of 2167.5 MHz. In addition, due to the proximity of the UMTS band 1 and DVB-SH frequency band and particularly due to potential cost savings and miniaturization, the mobile device 60 comprises the common antenna 71 for the exemplary embodiment. Furthermore, the receiver 62 and the receiving part of the transceiver 61 share the common amplifier 73 for the exemplary embodiment. Consequently, received signals intended for the transceiver 61 are also fed to the receiver 62 and, therefore, interfere with received signals intended for the receiver 62 when the receiver 62 and the transceiver 61 receive signals simultaneously. The same is true for the transceiver 61.

In order to improve performance of the mobile device 60, the mobile device 60 comprises the band-pass filters 63, 66 for the exemplary embodiment. Thus, after splitting a received signal captured by the antenna 71 and utilizing the splitter 74, the band-pass-filter 63 partly attenuates frequency components related to the received signal intended for the transceiver 61 and generates a signal x1(t), and the band-pass-filter 66 partly attenuates frequency components related to the received signal intended for the receiver 62 and generates a signal x2(t). For the exemplary embodiment, the band-pass filter 66 attenuates frequency components associated with received signals intended for the receiver 62 by 20-30 dB.

The signal x1(t), i.e. the received signal of the receiver 62 after leaving the band-pass filter 63, still comprises a signal component related to the received signal for the transceiver 61. Additionally, the signal x1(t) may also comprise a signal component related to the sending signal s(t) if the transceiver 61 sends a signal while the receiver 62 receives a signal. For the exemplary embodiment, the receiver 62 comprises the analog filter 64 which outputs a signal y1(t) to be fed to the mixer 65.

For the exemplary embodiment, the analog filter 64 is configured to generate a first estimation signal est1(t) and a second estimation signal est2 (t). The first estimation signal est1(t) is an estimation of the signal component related to the received signal for the transceiver 61 and the second estimation signal est2(t) is an estimation of the signal component related to the sending signals s(t). The analog filter 64 generates then the signal y1(t) by subtracting the first and second estimation signals est1(t), est2(t) from the signal x1(t).

The analog filter 64 generates the first estimation signal est1(t) by appropriately phase-shifting and/or adjusting the amplitude of a first reference signal r1(t) fed to the filter 64. The first reference signal r1(t) is coupled out from a path connecting the band-pass filter 66 and the analog filter 67 of the transceiver 61 utilizing an appropriate device 78. Thus, the first reference signal r1(t) is proportional to the signal x2(t) and corresponds to the received signal intended for the transceiver 61. The correct or at least a satisfactory phase-shift and/or amplitude adjustment for the first reference signal r1(t) may be found during an initial training process similar to the initial training process used for the conventional transmitter disclosed by V. Aparin. Alternatively, the analog filter can use a blind algorithm to remove any component of r1(t) from x1(t). The training process may particularly be based on the least mean square (LMS) method. For the exemplary embodiment, undesired frequency components within the signal x1(t) may be reduced by at least 40 dB utilizing the analog filter 64.

The analog filter 64 generates the second estimation signal est2(t) by appropriately phase-shifting and/or adjusting the amplitude of a second reference signal r2(t) fed to the analog filter 64. The second reference signal r2(t) is coupled out from the transmit path Tx of the transceiver 61 utilizing an appropriate device 79. Thus, the second reference signal r2(t) is proportional to the sending signal s(t). The correct or at least a satisfactory phase-shift and/or amplitude adjustment for the second reference signal r2(t) may also be found during an initial training process which may particularly be based on the least mean square (LMS) method.

The received signal for the transceiver 61 may also be corrupted by a signal component associated with the received signal intended for the receiver 62 and/or with a signal component associated with the sending signal s(t). Signal components associated with the received signal intended for the receiver 62 are attenuated by the band-pass filter 66. In order to further attenuate remaining signal components associated with the received signal intended for the receiver 62 and/or at least partly filter out signal components associated with the sending signal s(t), the transceiver 61 comprises the analog filter 67 for the exemplary embodiment.

For the exemplary embodiment, the analog filter 67 is configured to generate a third estimation signal est3(t) and a fourth estimation signal est4(t). The third estimation signal est3(t) is an estimation of the signal component related to the received signal for the receiver 62 and the fourth estimation signal est4(t) is an estimation of the signal component related to the sending signals s(t). The analog filter 67 generates then the signal y2(t) by subtracting the third and fourth estimation signals est3(t), est4(t) from the signal x2(t).

The analog filter 67 generates the third estimation signal est3(t) by appropriately phase-shifting and/or adjusting the amplitude of a third reference signal r3(t) fed to the analog filter 67. The third reference signal r3(t) is coupled out from a path connecting the band-pass filter 63 and the analog filter 64 of the receiver 62 utilizing an appropriate device 80. Thus, the third reference signal r3(t) is proportional to the signal x1(t) and corresponds approximately to the received signal intended for the receiver 62. The correct or at least a satisfactory phase-shift and/or amplitude adjustment for the third reference signal r3(t) may be found during an initial training process which may particularly be based on the least mean square (LMS) method.

The analog filter 67 generates the fourth estimation signal est4(t) by appropriately phase-shifting and/or adjusting the amplitude of the second reference signal r2(t). The correct or at least a satisfactory phase-shift and/or amplitude adjustment for the fourth estimation signal est4(t) may also be found during an initial training process which may particularly be based on the least mean square (LMS) method.

The analog filters 64 and/or 67 may also be configured to be by-passed when appropriate. The by-passing may be implemented similar as shown in FIGS. 3-5.

Finally, it should be noted that the aforementioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. The singular reference of an element does not exclude the plural reference of such elements and vice-versa. In a device claim enumerating several means, several of these means may be embodied by one and the same item of software or hardware. The mere fact that certain measures are recited in mutually different dependent claims does not indicate that a combination of these measures cannot be used to advantage.

The invention claimed is:

1. A method for processing a signal received by a receiver, the method comprising:
   receiving, at a first wireless receiver, a first signal which comprises a first signal component and a second signal component, wherein said first signal component is intended for said first wireless receiver, said second signal component is related to corruption generated by both a sending signal generated by a transmitter and a second signal intended for a second wireless receiver, and said first wireless receiver operates independently from said second wireless receiver and from said transmitter;
   providing, to said first wireless receiver, a reference signal which is proportional to said second signal component;
   generating, at said first wireless receiver, from said reference signal, an estimation signal which estimates said second signal component; and
   generating a filtered signal by subtracting said generated estimation signal from said first signal.

2. The method of claim 1, further comprising:
   only generating said filtered signal in accordance to a pre-defined condition.

3. The method of claim 2, wherein said pre-defined condition a minimum power of said reference signal.

4. The method of claim 1, wherein said second wireless receiver and said transmitter are incorporated into a transceiver which operates either in a receiving mode to receive said second signal or in a sending mode to send a sending signal and said first wireless receiver is configured to estimate said estimation signal based on said sending and receiving modes.

5. The method of claim 1, further comprising:
   receiving, with a single antenna, a received signal which comprises the first signal component and the second signal component;
   generating said first signal by partly filtering out from said received signal said second signal component intended for said second wireless receiver;
   generating an estimation of said second signal by partly filtering out from said received signal said first signal component;
   generating as said reference signal a first reference signal that is proportional to said estimation of said second signal;
   generating a first estimation signal with said first reference signal; and
   generating said filtered signal by subtracting said first estimation signal from said first signal.

6. The method of claim 5, further comprising:
   generating a second estimation signal with a second reference signal which is proportional to a sending signal; and
   generating said filtered signal by subtracting said second estimation signal from said first signal in addition to subtracting said first estimation signal from said first signal.

7. The method of claim 1, further comprising:
   measuring a power level of the reference signal.

8. The method of claim 7, further comprising:
   comparing the measured power level to a threshold.

9. The method of claim 8, further comprising:
only generating the filtered signal when the measured power level exceeds the threshold.

10. The method of claim. 1, wherein the first signal is in a higher frequency band and the sending signal is in a lower frequency band.

11. The method of claim 10, wherein the higher frequency band is a range of 2110-2170 MHz.

12. The method of claim 10, wherein the lower frequency band is a range of 1920-1980 MHz.

13. A system comprising:
a first wireless receiver comprising a first filter which is configured to receive a first signal which comprises a first signal component and a second signal component related to corruption generated by both a sending signal generated by a transmitter and a second signal intended for a second wireless receiver, wherein said first signal component is intended for said first wireless receiver; and
a second wireless receiver configured to receive the second signal component; and
a transmitter configured to generate a sending signal, wherein said first wireless receiver is configured to operate independently from said second wireless receiver, said second wireless receiver comprises a device configured to generate a reference signal which is proportional to said second signal component and said first filter is configured to generate, from said generated reference signal, an estimation signal which estimates said second signal component and to generate a filtered signal by subtracting said generated estimation signal from said first signal.

14. The system of claim 13, wherein said first wireless receiver is configured to only generate said filtered signal in accordance with a pre-defined condition.

15. The system of claim 14, wherein said pre-defined condition is a minimum power of said reference signal.

16. The system of claim 13, wherein said second wireless receiver and said transmitter are incorporated into a transceiver which operates either in a receiving mode to receive said second signal or in a sending mode to send said sending signal and said first wireless receiver is configured to estimate said estimation signal based on said sending and receiving modes.

17. The system of claim 13, further comprising:
a single antenna configured to receive a received signal which comprises the first signal component and to the second signal component;
a second filter configured to generate said first signal by partly filtering out from said received signal said second signal component;
a third filter configured to generate an estimation of said second signal by partly filtering out from said received signal said first signal component; and
a device for generating a first reference signal as a signal being proportional to said estimation of said second signal, wherein said first filter is configured to generate a first estimation signal as said estimation signal with said first reference signal and to generate said filtered signal by subtracting said first estimation signal from said first signal.

18. The system of claim 17, wherein said transmitter is configured to send said sending signal and comprises a device for generating a second reference signal which is proportional to said sending signal, said first signal comprises a signal component related to said sending signal, and said first filter is configured to generate a second estimation signal estimating said signal component related to said sending signal with said second reference signal and to generate said filtered signal by subtracting said second estimation signal from said first signal in addition to subtracting said first estimation signal from said first signal.

19. The system of claim 17, further comprising:
a diplexer configured to transmit and receive signals simultaneously through the single antenna.

* * * * *